United States Patent Office 3,651,233
Patented Mar. 21, 1972

3,651,233
METHODS FOR TREATING POSTOPERATIVE GASTROINTESTINAL CONDITIONS WITH 5-HYDROXYTRYPTAMINE
Jeanette L. Rubricius, Jamaica, N.Y., assignor to Beecham Group Limited, Brentford, Middlesex, England
No Drawing. Filed Oct. 3, 1969, Ser. No. 864,300
Int. Cl. A61k 27/00
U.S. Cl. 424—274
3 Claims

ABSTRACT OF THE DISCLOSURE

An orally administrable composition is provided for the treatment of postoperative gastrointestinal conditions such as paralytic ileus and abdominal distention. The active agent is 5-hydroxytryptamine which is administered in tablet form with suitable excipients in the amount of 2.5 to 25 mg., preferably in the unit dosage amount of 5 milligrams. The composition may also contain a potentiating amount of a parasympatheticomimetic agent such as neostigmine.

---

The present invention relates to an orally administrable pharmaceutical composition the active ingredient of which is 5-hydroxytryptamine preferably in tablet unit dosage form and to the method of treating postoperative gastrointestinal complications such as paralytic ileus therewith. A potentiating amount of a parasympatheticomimetic agent such as neostigmine may be administered concurrently.

Paralytic ileus or adynamic ileus is a type of paralysis of the small intestinal tract which may lead to intestinal obstruction and, in its severest form, to death, and to abdominal distention, discomfort and intestinal adhesions in its mildest form. The exact etiology of paralytic ileus is unknown but it occurs in a variety of conditions where peritonities, either chemical or suppurative, is a feature. Adynamic ilues often follows surgical operations on the abdomen even though the intestines are minimally handled at the time of surgery so as to avoid mechanical trauma. This constitutes a serious post-operative hazard since the dilated immobile loops of intestines may adhere to each other or to the body wall and cause serious mechanical obstruction to the bowel lumen. Or, the abdominal distention may impair respiration sufficiently to cause such pulmonary disease as atelectasis or bronchopnuemonia. Vomiting and aspiration pneumonia are not infrequent. The tension on the abdominal wall may impair wound healing to the point of wound disruption or evisceration. It plays a role in wound infection, and is a fairly frequent cause of postoperative hernia. Since all patients suffer some degree of adynamic ileus as a feature of abdominal surgery, its prevent and therapy is of paramount importance.

In the past, cathartics, intestinal intubation through the pharynx, and neostigmine injections have been the only available forms of therapy. Cathartics are generally ineffective and fail to stimulate or initiate intestinal peristalsis since the bowel is unresponsive to mucosal stimuli. Intestinal intubation is ineffective in preventing distension, although helpful in its therapy, but removal of liquid and gas from the dilated intestinal tract in itself does not initiate peristalsis and pulmonary complications do occur. Neostigmine is slightly effective in increasing the force of contractions in normal and mild adynamic ileus, but for the most part is ineffective since intestinal peristalsis is not initiated through the parasympathetic nervous system.

Analysis of the mucosa of human small intestines resected for paralytic ileus show that the mucosa of this bowel is deficient in 5-hydroxytryptamine. It is very likely that paralytic ileus results from a failure of the mucosa to produce 5-hydroxytryptamine. Even if the disease is not explainable on the basis of a deficiency, but the deficiency is a result rather than a cause of paralytic ileus, the adynamic bowel responds with peristaltic activity when 5-hydroxytryptamine is placed in the interstinal lumen. Smith et al. (Smith, M. K., et al., Brit. Jour. Surg. 52:381 (1965)) found that paresis of the bowel in cats and rabbits produced by various methods did not respond to vagus stimulation.

Peristalsis in the small bowel is a local reflex involving intestinal muscles and their intrinsic nerve plexuses. Peristalsis of extirpated bowel occurs in vitro when the bowel is bathed in a balanced salt solution. Hence, the central nervous system or impulses indicated through the vagus nerve or other extrinsic nerves are not required for the initiation or maintenance of peristalsis. Peristalsis can be initiated by mechanical stimulation of the small bowel or by chemical stimulation of the mucosa with strong acids, hypertonic solutions and the like. Hukuhara et al. (Hukuhara, T. et al., Jap. J. Physiol. 10:420 (1960)) has pointed out the similarity in the dog's small bowel between peristalsis initiated by these methods and the application on the mucosa or serosa of serotonin, 5-hydroxytryptamine. Serotonin produces the maximum intrinsic intestinal reflex.

Initiation in the peristaltic reflex in isolated and profused dog bowel cause the liberation of large amounts of serotonin from the mucosa into the intestinal lumen. The intraluminal profusate contains much more serotonin the greater the peristaltic activity becomes. The mucosa of the intestine contains almost all of the serotonin found in the intestinal wall (Feldberg, W. and Toh, C. C., Jour. Physiol. 119:352). Buebring was able to show that when the fluid passing through the intestinal tract of a guinea pig contained serotonin, it stimulated peristalsis and that peristalsis caused the liberation of serotonin. Ginzel showed that antagonists of serotonin did indeed inhibit peristaltic reflex of guinea pig ileus (Ginzel, K. H., J. Physiol. 136:62 (1957)).

In spite of the profound effects which serotonin has on the bowel, most investigators have feared its injection because of the resulting marked vasomotor and other side effects (Spies, T. D. and Stone, R. E., J.A.M.A. 150:1599 (1952)) which occurs with as little as 0.5 mg. injected systemically. Tumors which produce serotonin are characterized by severe vasomotor alternations which have become known as the "carcinoid syndrome." Hyperperistalsis and abdominal pain from hyperperistalsis is often seen with hypersecretion of serotonin from carcinoid tumors (Mengel, C. E., Arch. Int. Med. 117:256 (1966)). However, a good proportion of the serotonin is inactivated by the liver so that systemic effects do not occur when sorotonin is injected into the portal venous system or absorbed from the G.I. tract.

Smith et al. (Smith, M. K. et al., Brit. J. Surg. 52:381 (1965)) found that paresis of the small bowel in cats and rabbits produced by various trauma did not respond to vagus stimulation alone; but, did respond with peristalsis when 5-hydroxytryptamine was infused intravenously. However, while the vagus was stimulated, the necessary amounts of 5-hydroxytryptamine infused via a systemic vein were always in excess of those required to produce considerable disturbances in the blood pressure and cardiopulmonary system.

In similar experiments done in connection with the present invention, the results were more effective when the 5-hydroxytryptamine was given by mouth and changes in the cardiorespiratory system did not occur.

EXAMPLE

Five milligrams of 5-hydroxytryptamine are given by mouth in the form of a coated tablet diluted with a water-soluble powder carrier. Neostigmine or parasympatheticomimetic drugs may be added to the mixture and may potentiate the action of the 5-hydroxytryptamine. Although doses up to 25 mg. are well tolerated, it is rare that an excess of 5 mg. is required in a single oral dose.

The invention essentially resides in a treatment for paralytic ileus and abdominal distention consisting of the oral administration of 5-hydroxytryptamine with or without a potentiating amount of a parasympatheticomimetic agent and the oral dosage unit form therefor.

What is claimed is:

1. A method of treating and alleviating postoperative paralytic ileus and abdominal distention which comprises orally administering to a patient in need thereof after abdominal surgery a composition consisting of coated tablets in unit dosage form having 2.5 to 25 milligrams of 5-hydroxytryptamine until the paralytic ileus and abdominal distention are alleviated.

2. A method of treating paralytic ileus and abdominal distention according to claim 1 in which the unit dosage of 5-hydroxytryptamine is 5 mg.

3. A method of treating paralytic ileus and abdominal distention according to claim 1 in which the composition contains a potentiating amount of neostigmine as parasympatheticomimetic agent.

References Cited

Merck Index, 8th ed. (1968), p. 725.

Ulrich, J. Pharm. Pharmacol., 17 (11), pp. 710–720 (1965).

STANLEY J. FRIEDMAN, Primary Examiner